United States Patent [19]

Brownstein et al.

[11] Patent Number: 4,745,413
[45] Date of Patent: May 17, 1988

[54] ENERGIZING HEATING ELEMENTS OF A THERMAL PRINTER

[75] Inventors: Scott A. Brownstein; Holden Caine, both of Rochester, N.Y.

[73] Assignee: Eastman Kodak Company, Rochester, N.Y.

[21] Appl. No.: 56,935

[22] Filed: Jun. 3, 1987

[51] Int. Cl.[4] ............................................. G01D 15/10
[52] U.S. Cl. ............................... 346/76 PH; 219/216; 400/120
[58] Field of Search ................. 346/1.1, 76 PH, 76 R; 400/120, 120 PH; 219/216, 216 PH

[56] References Cited

U.S. PATENT DOCUMENTS

| 3,975,707 | 8/1987 | Ito et al. | 346/76 R |
| 4,395,146 | 7/1987 | Arai | 400/121 |
| 4,575,732 | 3/1986 | Kitaoka | 400/120 |
| 4,621,271 | 11/1986 | Brownstein | 346/76 PH |
| 4,652,289 | 3/1987 | Tanaka | 346/76 PH |

Primary Examiner—E. A. Goldberg
Assistant Examiner—Huan H. Tran
Attorney, Agent, or Firm—Raymond L. Owens

[57] ABSTRACT

A continuous tone thermal printer having a print head with a plurality of heating elements is disclosed. Each heating element is energized during first and second halves of a line print time interval to more uniformly distribute heat during such interval.

2 Claims, 6 Drawing Sheets

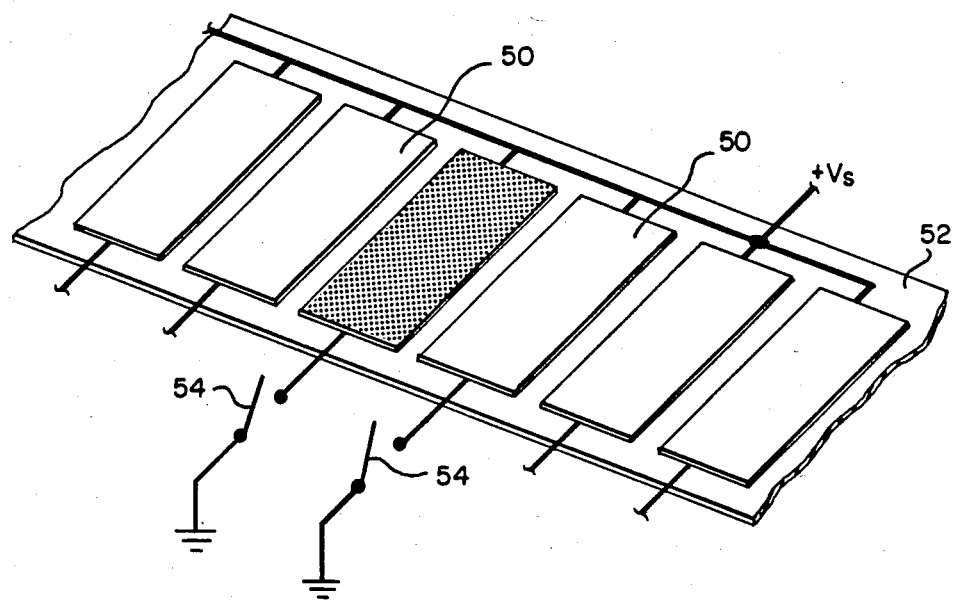
FIG. 3
FIG. 4
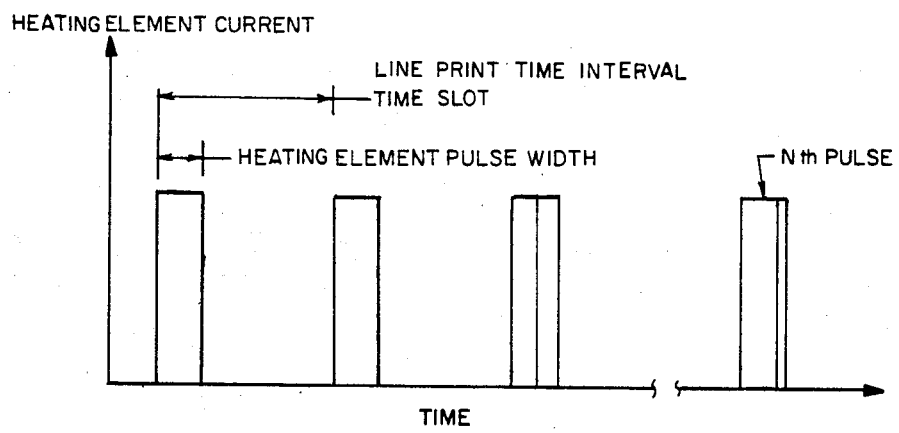

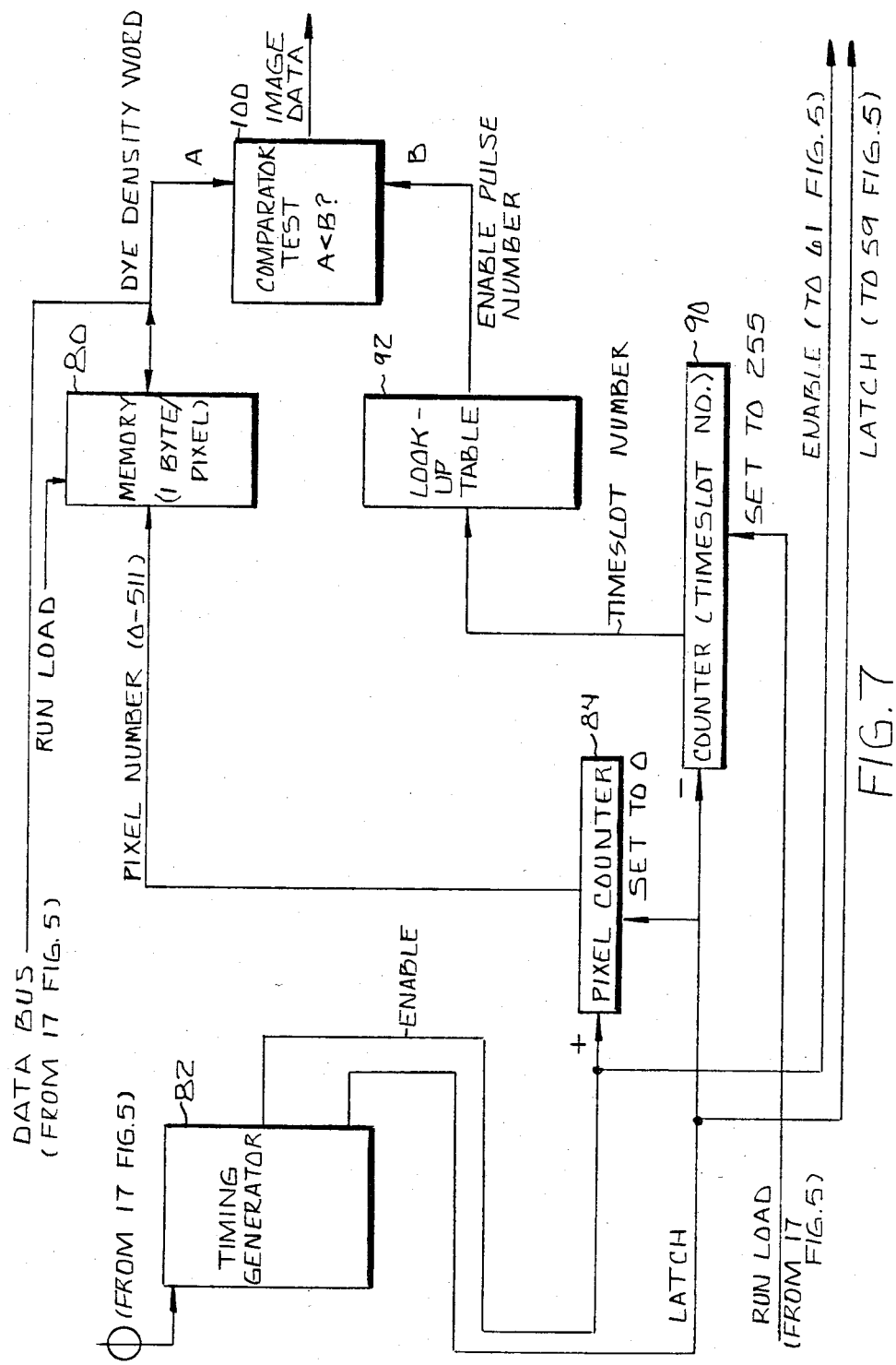

ENERGIZING HEATING ELEMENTS OF A THERMAL PRINTER

BACKGROUND OF THE INVENTION

1. Field of the Invention

The present invention relates to thermal printers wherein the selective energization of heating elements causes the transfer of dye to a receiver member while minimizing line gaps.

2. Description of the Prior Art

Some thermal printer apparatus use a dye transfer process. In this process, a carrier containing a dye is disposed between a receiver, such as paper, and a print head formed of for example a plurality of individual thermal heat producing elements which we will refer to as heating elements. The receiver is mounted on a rotatable drum. The receiver and carrier are generally moved relative to the print head which is fixed. When a particular heating element is energized, it is heated and causes dye to transfer (e.g. by sublimation) from the carrier to an image pixel in the receiver. The density, or darkness, of the printed dye is a function of the temperature of the heating element and the time the carrier is heated. In other words, the heat delivered from the heating element to the carrier causes dye to transfer to an image pixel of a receiver. The amount of dye is directly related to the amount of heat transferred to the carrier.

Thermal dye transfer printer apparatus offer the advantage of true "continuous tone" dye density transfer. By varying the heat applied by each heating element to the carrier, a variable dye density image pixel is formed in the receiver.

The print head heating elements are modulated (operated) in pulse width or pulse count modes of operation. In pulse width modulation a single constant current pulse is applied to each heating element. The pulse width of a constant current pulse causes its image pixel to have a desired gray scale. Pulse width modulation varies the percentage of the line printing time that a heating element is energized and thereby varies the time that the heating element is above the dye transfer temperature. In printing images, the individual heating elements must not be allowed to overheat and sustain permanent damage. In pulse count modulation, the number of constant current pulses is varied to produce the desired image pixel gray scale.

Using high pulse rate stepping motors or dc drive motors, most thermal printing systems rotate the drum and thereby provide relative motion between the heating elements and the receiver during printing. The reasons for producing this motion are to avoid overheating, sticking of the carrier to the head and maintaining relatively smooth motion for registration control. As the dye is deposited, there is some degree of smear which is desirable, since the image is supposed to be of a spatially continuous form and some smear helps to "integrate" the image pixels to the viewer. Due to this continuous motion of the receiver and the partial power duty cycle of the heating elements, some objectionable "gaps" between image lines can often be observed, depending on the actual size of the heating elements themselves. These gaps take the form of lines transverse to the direction of receiver movement, growing in perceptibility as the image density decreases. As demonstrated in FIG. 6A and discussed later in this disclosure, dye is mostly transferred over the first half of the allocated image pixel space. As the density of image pixels decrease, miage line gaps increase and become more objectionable.

To minimize these image line gaps, the area of the heating elements can be increased to cause successive lines to overlap. At lower and lower percentages of power cycles this solution has problems. First, the power required for a heating element to reach a desired temperature will increase as its area increases. Also, increasing the area of the heating elements will reduce spatial resolution of the printed image.

SUMMARY OF THE INVENTION

It is an object of this invention to reduce image line gaps without increasing the area of heating elements and also to minimize the peak temperature of the heating elements.

This object is achieved by a continuous tone, thermal printer apparatus including a print head having a plurality of heating elements, each such heating element being selectively energized for a particular portion of a time interval during which image pixels of a line are formed. The apparatus comprises:

a. means for storing values representing the desired density of each image pixel of a line; and b. means responsive to such stored numbers for energizing each said heating element during different portions of such time interval to cause the heat produced by such heating elements to be uniformly distributed throughout the time interval such that line gaps are reduced.

An important feature of this invention is that it will reduce the potential for carrier or receiver damage caused by localized peak temperature "hot spots" in the center of heating elements.

The energy applied to heating elements is more uniformly distributed throughout the printing time interval for each line. The thermal time constant for the heating elements will generally tend to integrate the applied energy over each line printing interval.

DESCRIPTION OF THE DRAWINGS

FIG. 3 is a perspective of several heating elements used in the print heat of the thermal printing apparatus of FIG. 1;

FIG. 4 illustrates the constant current pulses which are applied to a single heating element in accordance with the invention;

FIG. 7 is a schematic of the control circuit 68 shown in FIG. 5.

DESCRIPTION OF THE PREFERRED EMBODIMENT

Figure 1:
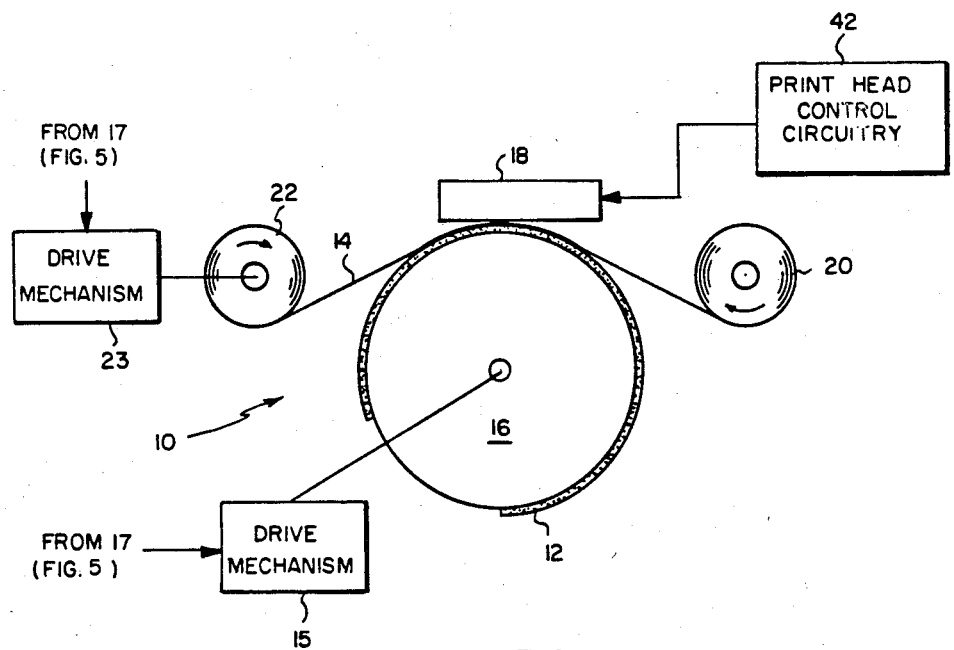
FIG. 1 is a schematic of a thermal printer apparatus which can be employed to make continuous tone dye images in accordance with the invention.

Referring now to FIG. 1, thre is shown a thermal printer apparatus 10 which is adapted to print color images a line of pixels at a time on a receiver member 12 from dyes transferred from a carrier member 14. The receiver member 12 is in the form of a sheet. It is secured to a rotatable drum 16 which is mechanically coupled to a drive mechanism 15. The drive mechanism 15 continuously advances the drum 16 and the receiver sheet 12 past a stationary thermal print head 18. The print head 18 has a plurality of heating elements (resistors) which are shown more clearly in FIG. 3. These heating elements press the carrier member 14 against the receiver member 12. The carrier member 14 is shown in the form of a web and is driven from a supply roller 20 onto a take-up roller 22. The drive mechanisms 15 and 23, each include motors. These motors continuously advance the carrier and the receiver, respectively, relative to the heating elements of the print head 18. During printing, the heating elements are addressed and selectively energized as the carrier and receiver are moved relative to them. Accordingly, a printed dye image pixel will be somewhat larger than if the carrier and receiver were stationary during dye transfer. The movement of the carrier is necessary to reduce sticking of the carrier to the heating elements in the print head 18.

As the receiver member 12 moves through the print region, the selective energization of heating elements results in the printing of dye image pixels on the receiver. The process by which the heating elements are energized will be described later. The color of this image is determined by the color of the thermally transferable dye contained in each frame of the carrier member 14 that is being driven past the print region. After one complete color frame of an image has been printed, receiver 12 is returned to an initial, or home position. Carrier member 14 is advanced to move another color from into position for printing, and print the next color image of the image superimposed onto the previously printed image.

FIG. 3 shows in schematic form several heating elements 50 of the print head 18. Each heating element 50 is made of a thin film of a resistive material, which is mounted on a non-conductive support 52. When a switch 54 is closed, a constant current pulse flows through the heating element. Although thin film heating elements are shown, it will be understood that thick film heating elements can also be used in accordance with the invention.

Figure 2:
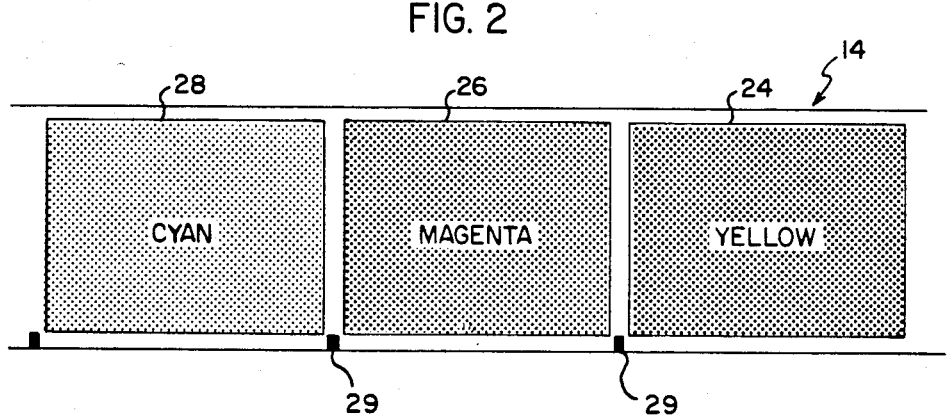
FIG. 2 is a top view of a carrier for use in the thermal printer apparatus of FIG. 1.

In FIG. 2 the carrier member 14 is shown in the form of a web with a repeating sequence of sections or frames of thermally transferable dye. Each frame in a sequence has a different color heat transferable dye. For example, each sequence of frames includes a frame of yellow thermally transferable dye 24, followed by a frame of magenta thermally tranferable dye 26, followed by a frame of cyan thermally transferable dye 28. This sequence of yellow, magenta and cyan dye frames is of course repeated. Reference marks 29 are shown which can be used in the well known manner to control the operation of the drive mechanisms 15 and 23.

With reference to FIG. 1, the operation of the apparatus will be briefly described. Drive signals are continuously provided to the drive mechanism 15 from a microcomputer 17 (see FIG. 5) to rotate the drum 16 to bring successive areas of the receiver sheet 12 into the print region opposite print head 18 and the receiver sheet 12. Both the receiver and the carrier members are moved relative to the print head during this printing operation.

FIG. 4 shows constant current pulses applied to a single heating element 50 during a line print time interval to form an image pixel. During such interval, an individual heating element is addressed a predetermined number of times (N). This predetermined number is the maximum possible number of dye density levels. In other words, there are N possible current pulses in a time interval for each heating element of a group. Each time interval has N time slots. Each time a heating element is addressed during a time slot, only a single current pulse can be applied to it. After all the heating elements have been addressed one time, the process is repeated $N-1$ times for each heating element until a line of image pixels is printed. By changing the "on-time" or duration of the group enable signals to each heating element, the constant current pulse width can be changed.

Figure 5:
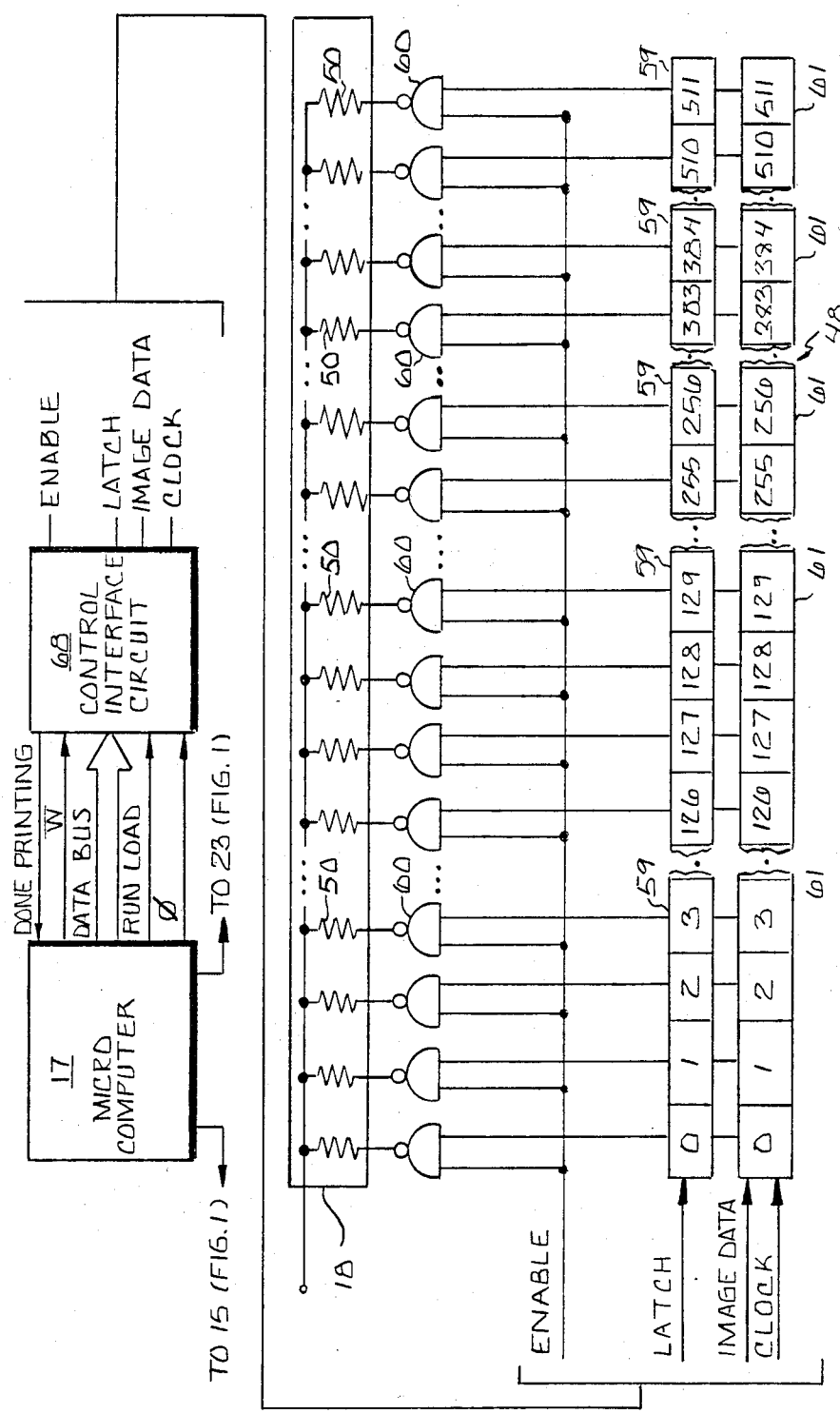
FIG. 5 is a schematic of the control circuit for operating the heating elements in the print head for the thermal printer apparatus of FIG. 1.

It will be understood that the heating elements can be arranged into a plurality of heating elements with each group being separately addressed by its own enable line. The color of each colored image pixel is represented by an 8-bit digital dye density word which as shown in FIG. 5 is applied over the data bus to control circuitry 68. Control circuitry 68 produces enable signals. The duration of these signals can be used to adjust the pulse width of the constant current pulses which are applied to each heating element.

Turning briefly to FIG. 5, it is noted that the microcomputer 17 provides a write signal (W), a clock signal $\phi$, and data signals over a data bus to a control interface circuit 68. The data signals are 8 bit digital signals or words which represent the dye density levels of image pixels.

Control circuit 68 under the control of the microcomputer 17 provides clock signals to a shift register 61. For the sake of example, we wil assume there are 512 heating elements in print head 18. The image data from the control circuit 68 are loaded into the shift register 61 until all of its 512 stages either contain a high (1) or a low (0) signal level or state. A latch signal provided by the control circuitry 68 causes data in each state of the shift register 61 to be entered into a corresponding stage of a latch 59. A high enable signal held on the output of a latch is connected to a corresponding Nand gate 60 which is addressed when an enable signal is high. A circuit is completed through heating resistors 50 and the Nand gates 60 which have their corresponding latch stages in a high state. In other words, a heating element is energized. The pulse duration pulse width is controlled by the time that the enable signal is high. After the enable signal is turned low, the current pulse is turned off (the others are still low). With each enable signal all the 512 heating elements 50 of the print head are addressed and may be selectively energized one time, depending on the state of their corresponding stages in latch 59. Now let us assume there are 255 possible dye density levels. In other words N is equal to 255. The shift register 61 will have to be loaded with data 255 different times. Each group of heating elements will be addressed 255 times. Each heating element can be selectively energized 255 different times depending on the desired image pixel dye density.

Figure 6A:
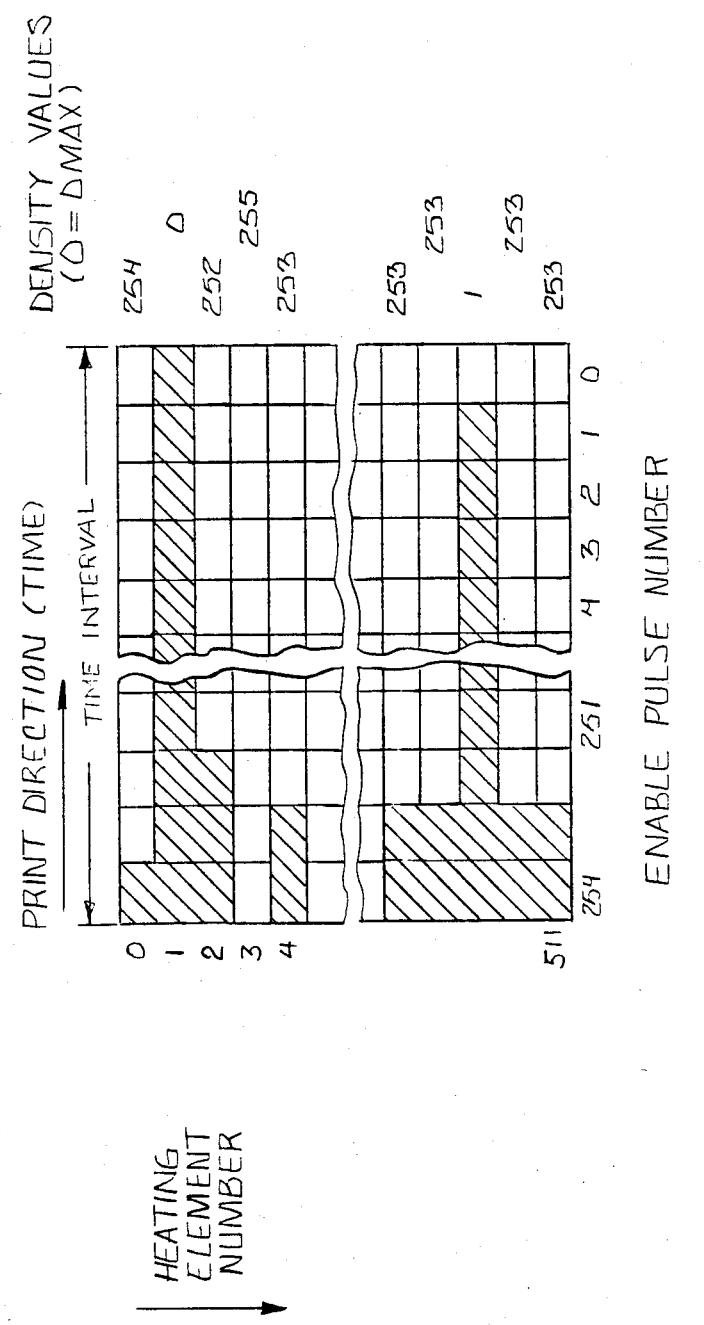
FIG. 6A is a schematic representation of a conventional pulse code modulation scheme.

FIG. 6A shows a conventional scheme for sequencing the energization of heating elements to attain different density levels for pixels of a single line. It will be noted that the energizations (shaded areas) of each given heating element occur during successive time slots until the desired density level is attained. The depicted modulation scheme has 255 density values which have values which vary from 0 to 254. The value "0" represents ($D_{MAX}$) and 254 represents ($D_{MIN}$). Also we will assume there are 512 heating elements which are numbered from 0 to 511. Also there will be 255 enable pulses. The first enable pulse will be numbered 254 and the last enable pulse 0. Each enable pulse occurs during a time slot. The first enable pulse corresponds to enable pulse number 254. During the first time slot of the line printing interval (enable pulse number 254) first heating element ("0") will be energized (shaded). During the remaining time slots of such interval, it will be de-energized. By way of example, note that heating element number 4 will be energized only during the first two time slots. If all of the heating elements were energized only during the first two time slots, there would be an increased likelihood of a line gap being formed.

Figure 6B:
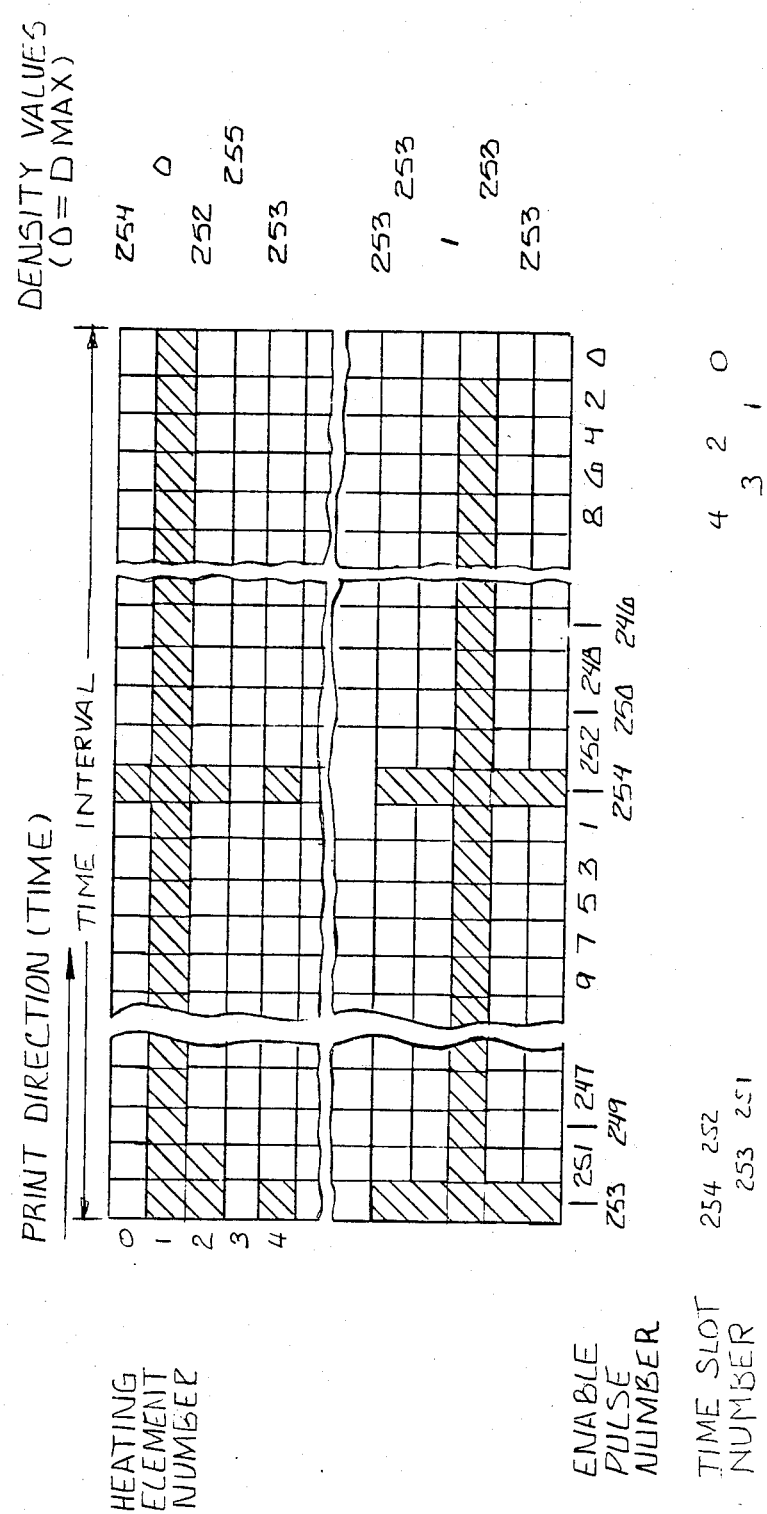
FIG. 6B is a schematic representation of a pulse code modulation scheme in accordance with the invention.

FIG. 6B shows a pulse code modulation scheme in accordance with the invention, wherein the same number of enable pulses as the FIG. 6A conventional scheme is used, although they are split in two groups corresponding to the first and second halves of the line print time interval. The printing line interval time is the same as FIG. 6A, but the energy produced by each heating element is more evenly distributed over such interval. This scheme is accomplished by moving the even-numbered enable pulse numbers to the second half of the time interval. As shown, the energization of the heating elements (shaded area) is distributed between the first and second half of the time interval. This causes the heat produced by the heating elements to be more uniformly distributed throughout the time interval reducing line gaps. This will be explained later.

Turning now to FIGS. 5 and 7, the control circuit 68 is shown which accomplishes the scheme of FIG. 6B in detail. In response to a run load signal from the microcomputer 17, pixel data for a line is loaded into memory 80. A line of data has 512 separate bytes, one for each heating element. Each byte corresponds to a density number from 254 to 0, with 254 corresponding to the lowest density ($D_{MIN}$) and 0 corresponding to a maximum density ($D_{MAX}$).

In other words, an image data digital signal has one bit entered into each stage of the shift register 61. The number (N) of such image data digital signals for each image pixel is equal to the maximum number of dye density levels. We will continue with our example where there are 255 possible dye density levels for each dye image pixel. During the printing of a line, there will be 255 enable signals provided by a timing generator 82. The timing generator 82 also provides the enable and latch signals to the shift register 61.

In response to a run load signal from the microcomputer 17, the memory 80 responds to pixel data on a data bus and enters into memory 80, 512 dye density words, each such digital word (8 bits or a byte) being representative of the dye density level of a particular image pixel. If a word is the number "255", it corresponds to a minimum dye density ($D_{MIN}$), and if it is the number "0" it is at the maximum dye density ($D_{MAX}$).

The timing generator 82, in response to a clock signal produced by the micrcomputer 17, produces latch and enable signals to latch 59 and shift register 61 (see FIG. 5). The latch signal is provided once each line.

Just after a latch signal sets a pixel counter 84, clock pulses are counted by this pixel counter 84. The pixel counter 84 produces 512 output signals for sequentially identifying all the dye density storage locations in memory 80. The run load signal sets counter 90 to the number 255. Each latch signal causes the counter 90 to count down starting from 255 to 0. Counter 90 is set to 255 by the run latch signal upon the application of the first latch signal. The number held in the counter 90, will be called the time slot number. The time slot number varies from 255 to 0. The counter 90 applies the time slot number pulse enable number 254 to the look up table 92 (LUT). For example, as shown in FIG. 6B when the time slot number is 254, the output of the LUT 92 is enable number 253. (See FIG. 7). This enable number (B) is applied to comparator 100. The comparator 100 sequentially compares each of the 512 number in memory 80 (dye density word A) against the enable number B. If the dye density word value A is less than than the enable number B, $A < B$, the image data line is turned on (high) and a 1 is entered into the register 59. If the dye density word value A is greater than the enable number B, the output of the comparator is turned low. After all 512 numbers are compared, the latch signal sets the pixel counter 84 to zero (0) and causes the next pulse enable number 254 to be entered into LUT 92. As shown in FIG. 6B, the next time slot number 253 causes enable number 251 to be produced by the look up table 92. The process described above is now repeated in accordance with the scheme of FIG. 6B with the odd number enable pulse number being produced in the first half of the time interval and the even number enable pulses being produced in the second half of the time interval.

Other schemes can also be used in accordance with the invention to distribute the heat produced by the heating elements during the two halves of the line print time interval. For example, changes could be made in the operation of the look up table 92 to change the sequencing of energizing the heating elements.

We claim:

1. In a continuous tone, thermnal printer apparatus including a print head having a plurality of heating elements, each such heating element being selectively energized for a particular portion of a time interval during which image pixels of a line are printed, the improvement comprising:
   a. means for storing values representing the desired density of each image pixel of a line, and
   b. means responsive to such stored numbers for selectively energizing each said heating element during both the first and second halves of such time interval to cause the heat produced by such heating elements to be uniformly distributed throughout the time interval such that line gaps are reduced.

2. In a continuous tone thermal printing apparatus including a print head having a plurality of heating elements, one for each image pixel, the heating elements being simultaneously addressable N different times over a time interval to print a line of pixels and selectively energizable when addressed with constant current pulses to provide N different possible heat levels which cause dye to transfer to form image pixels of a line, the improvement comprising:
   a. a shift register having one operative stage for each heating element;

b. a digital memory for holding a selectable number of dye density words, each such word being representative of the dye density level of a particular image pixel;

c. logic means responsive to the dye density words for sequentially storing N image data digital signals in the stages of the storage device in a particular pattern in which the state of each stage coresponding to whether or not a corresponding heating element is to be selectively energized when addressed, the pattern being selected so that the heating elements are energized during both the first and second halves of the line print time interval so that heat is uniformly distributed and gaps between lines of image pixels are reduced; and d. means for sequentially addressing the groups of heating elements each time one of the N image data digital signal is stored in the storage device with each of heating elements being addressed N separate times.

* * * * *